No. 665,604. Patented Jan. 8, 1901.
J. F. IVES.
PNEUMATIC TIRE.
(Application filed Oct. 8, 1897.)
(No Model.)
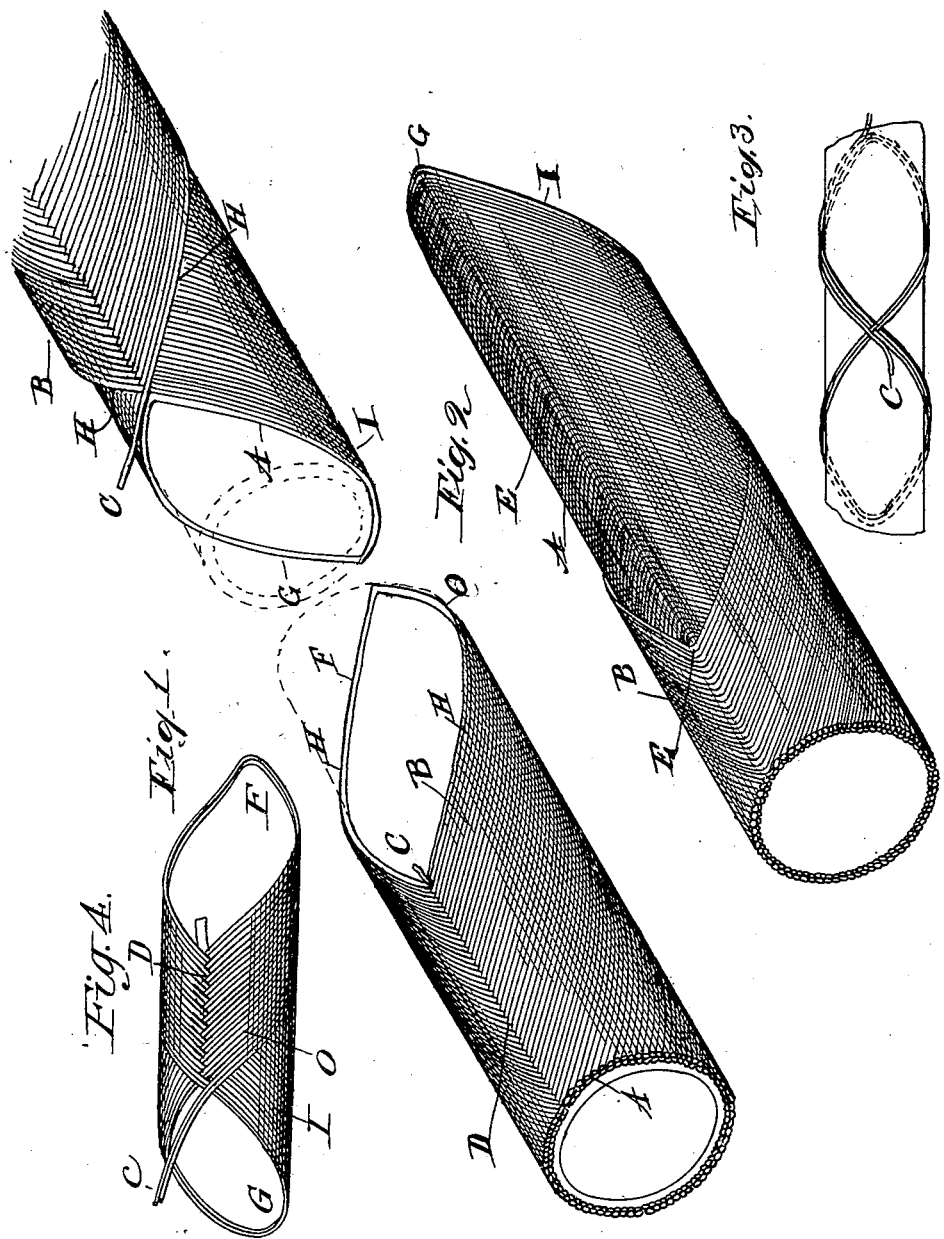

UNITED STATES PATENT OFFICE.

JOHN F. IVES, OF CLEVELAND, OHIO.

PNEUMATIC TIRE.

SPECIFICATION forming part of Letters Patent No. 665,604, dated January 8, 1901.

Application filed October 8, 1897. Serial No. 654,518. (No model.)

*To all whom it may concern:*

Be it known that I, JOHN F. IVES, a citizen of the United States, and a resident of Cleveland, county of Cuyahoga, State of Ohio, have invented certain new and useful Improvements in Pneumatic Tires, of which I hereby declare the following to be a full, clear, and exact description, such as will enable others skilled in the art to which it appertains to make and use the same.

My invention relates to improvements in pneumatic tires; and the objects of the invention are to provide a tubular reinforcement for the tire composed of multiply fabric, so wound of continuous thread as to permit the open extremities to be joined or telescoped without increasing the size of the tube at the point of union; and my further object is to provide the greatest possible elasticity in the tread and a corresponding rigidity of the sides and bottom.

My invention consists in a tubular fabric composed of inner and outer plies, the threads forming one ply crossing the threads forming the other ply at right angles, both plies being composed of one integral continuous thread or group of threads, as hereinafter described, shown in the accompanying drawings, and specifically pointed out in the claims.

In the drawings, Figure 1 shows a view in perspective of the rim side of the tire. Fig. 2 is a similar view of the tread, and Fig. 3 is a detail view showing a plan of the winding. Fig. 4 is a view of a section of tire wound with two continuous threads in place of one.

As shown in the figures, A is the inner ply of the fabric, and B the outer ply, formed thereon by continuously winding the thread C.

As shown in Fig. 3, the thread is wound from the tread diagonally toward the rim side. It then crosses the rim side and turns again to the tread, thence it is brought back at right angles to itself and returns to the rim side, crossing itself centrally, and thence again passes diagonally to the tread, where it bends again upon itself and follows the first-laid strand indefinitely, each completed passage around the tire showing the form of a figure 8, as shown in dotted lines in Fig. 3, the strands crossing over the center of the rim side first in one direction and then in another and gradually forming a closely-braided surface, as shown at D. Meanwhile the angular bends or loops (shown at E) upon the tread approach and cross one another at right angles, those in the outer layer pointing in the opposite direction to those in the inner layer, and not being connected except by a thin fiber of rubber form an exceeding resilient tread. The thread is wound upon a mandrel or upon an inner tube. It is preferably friction-coated or saturated with rubber cement before winding. If wound upon a mandrel, the plies are afterward coated with rubber cement. It will be observed that after the tube is completed in this manner the extremities take the form shown in Figs. 1 and 2. The portion first completed, as at F, shows only the outer coating wound angularly to give a diagonally-cut extremity. The other extremity G shows also the angular outer coating O; but beneath this projects the angularly-wound inner coating I, which is designed to be telescoped within the other extremity, thus joining the diagonal sides H and H of the outer coating closely together where they fit exactly, since they have the same angular projection upon the tube, and the outer surfaces of the tube extremities will coincide exactly, thus making the tube smoothly-surfaced.

To facilitate joining the extremities, the backing upon which the tubular construction is wound can be made slightly larger in diameter at the extremity.

The advantages of the construction described are obvious, among which will be seen a more yielding tread-surface accompanied by rigid side walls, and an increased constrictive power in the rim side, which is obtained from the braided surface, the action of which is to contract about the rim when the tire is inflated.

If desired, two or more threads can be wound simultaneously to form one course, as shown in Fig. 4, or they may be wound to a greater depth than two-ply, or other changes can be made which do not depart from the spirit of the invention.

I believe myself to be the first to form a tubular construction of fabric forming two or more plies of threads angularly wound at right angles to one another, and so wound and braided as to provide one finished extremity consisting of the outer layer and one in which the inner layer will project beyond the outer, whereby the extremities can be telescoped to join the outer and inner layers exactly together and produce a smooth exterior and interior surface. I also believe myself to be the first to form a tubular construction of fabric in which one extremity can be telescoped or joined to the other to form a continuous tube without broken surface of equal thickness throughout.

Having described my invention, what I claim as new, and desire to secure by Letters Patent, is—

1. In a pneumatic tire, a tubular reinforcing fabric therefor, consisting of two plies of thread, wound diagonally in the form of a figure 8, the thread of the outer ply crossing the threads of the inner ply angularly, whereby the outer ply will project at one extremity and the inner ply at the other extremity, thus permitting telescoping of the extremities, substantially as described.

2. In a pneumatic tire a tubular reinforcing fabric therefor, consisting of two plies, the said plies being composed of a single continuous thread wound in the form of a figure 8, each succeeding course lying parallel with the first course, whereby each course will cross itself and become interlaced or braided with succeeding courses at the rim side, and will form overlapping, oppositely-pointed angles upon the tread, substantially as and for the purpose set forth.

3. In a pneumatic tire, a reinforcing tubular fabric consisting of two plies of fabric, an inner and an outer ply, said plies consisting of a continuous thread wound in the form of a figure 8 about the tire, and arranged to provide a series of diagonally-disposed parallel strands, the strands of the upper ply crossing angularly the strands of the lower ply, the construction and arrangement being such that the plies interlace to form a braided connection at the rim side, and form overlapping angles at the tread, the said angles being oppositely pointed in the several plies, substantially as described.

4. In a pneumatic tire, a reinforcing tubular fabric consisting of two plies of single thread, the said plies consisting of a continuous course of thread diagonally wound forward and backward in the form of a figure 8 about the tire and so arranged as to form interlaced or braided strands upon the rim side of the tire and parallel diagonally-disposed strands upon the side walls of the tire, and angles upon the tread, the strands of the upper ply crossing the strands of the lower ply at angles therewith, substantially as described.

Signed at Cleveland, Ohio, this 28th day of September, 1897.

JOHN F. IVES.

Witnesses:
WM. M. MONROE,
F. B. GARRETT.